(12) United States Patent
Park et al.

(10) Patent No.: US 12,522,729 B2
(45) Date of Patent: Jan. 13, 2026

(54) POLYAMIDE-IMIDE BLOCK COPOLYMERS, PREPARATION METHOD THEREOF AND POLYAMIDE-IMIDE FILM COMPRISING THE SAME

(71) Applicant: LG CHEM, LTD., Seoul (KR)

(72) Inventors: Gieun Park, Daejeon (KR); Jae Gu Lim, Daejeon (KR); Yoon Bin Lim, Daejeon (KR); Tae Seob Lee, Daejeon (KR); Seung Joon Lim, Daejeon (KR); Se Jeong Kim, Daejeon (KR); Woo Han Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 972 days.

(21) Appl. No.: 17/432,886

(22) PCT Filed: Apr. 9, 2020

(86) PCT No.: PCT/KR2020/004821
§ 371 (c)(1),
(2) Date: Aug. 20, 2021

(87) PCT Pub. No.: WO2020/209625
PCT Pub. Date: Oct. 15, 2020

(65) Prior Publication Data
US 2022/0220308 A1   Jul. 14, 2022

(30) Foreign Application Priority Data
Apr. 9, 2019 (KR) .................. 10-2019-0041556

(51) Int. Cl.
*C08L 79/08* (2006.01)
*C08G 73/10* (2006.01)
*C08G 73/12* (2006.01)
*C08G 73/14* (2006.01)

(52) U.S. Cl.
CPC .......... *C08L 79/08* (2013.01); *C08G 73/1032* (2013.01); *C08G 73/1039* (2013.01); *C08G 73/1042* (2013.01); *C08G 73/1067* (2013.01); *C08G 73/124* (2013.01); *C08G 73/14* (2013.01); *C08L 2201/08* (2013.01); *C08L 2203/16* (2013.01)

(58) Field of Classification Search
CPC ................ C08G 73/1042; C08G 73/14; C08G 73/101
See application file for complete search history.

(56) References Cited

U.S. PATENT DOCUMENTS

| 6,479,581 | B1 | 11/2002 | Ireland et al. | |
|---|---|---|---|---|
| 10,066,073 | B1 | 9/2018 | Williams et al. | |
| 2010/0086871 | A1* | 4/2010 | Chou ................ | C08G 73/1042 528/322 |
| 2012/0135251 | A1 | 5/2012 | Jeong et al. | |
| 2017/0133654 | A1* | 5/2017 | Cho .................... | C09D 179/08 |
| 2018/0148544 | A1* | 5/2018 | Ho ........................ | C08G 69/44 |
| 2018/0355110 | A1 | 12/2018 | Kim et al. | |
| 2019/0010291 | A1 | 1/2019 | Choi et al. | |
| 2019/0153159 | A1 | 5/2019 | Jang et al. | |
| 2021/0246265 | A1* | 8/2021 | Lee ........................ | C08G 73/14 |
| 2021/0301133 | A1 | 9/2021 | Mizori | |

FOREIGN PATENT DOCUMENTS

| CN | 108350171 A | 7/2018 | | |
|---|---|---|---|---|
| JP | 2004-333672 A | 11/2004 | | |
| JP | 2008231170 A | * 10/2008 | | |
| JP | 5942980 B2 | 6/2016 | | |
| JP | 2019-506479 A | 3/2019 | | |
| JP | 2020-525575 A | 8/2020 | | |
| KR | 10-0648874 B1 | 11/2006 | | |
| KR | 10-2017-0136285 A | 12/2017 | | |
| KR | 10-2018-0003436 A | 1/2018 | | |
| KR | 10-2018-0029774 A | 3/2018 | | |
| KR | 10-2018-0055715 A | 5/2018 | | |
| KR | 10-2018-0098003 A | 9/2018 | | |
| KR | 10-2018-0107641 A | 10/2018 | | |
| WO | WO-2008114797 A1 * | 9/2008 | ........... | C08G 73/106 |
| WO | 2012-115216 A1 | 8/2012 | | |
| WO | 2018-155830 A1 | 3/2018 | | |
| WO | 2018-237377 A1 | 12/2018 | | |
| WO | WO-2024141321 A1 * | 7/2024 | ............. | B33Y 70/00 |

OTHER PUBLICATIONS

International Search Report issued for PCT/KR2020/004821 on Jul. 31, 2020, 4 pages.
Kim et al., "Synthesis and Characterization of Photosensitive Polyimides for Optical Applications", Macromolecules, (2001) vol. 34, No. 26, pp. 8925-8933.
Extended European Search Report dated Feb. 23, 2022, of the corresponding European Patent Application No. 20787094.0, 9 pages.

* cited by examiner

*Primary Examiner* — Michael M Dollinger
(74) *Attorney, Agent, or Firm* — ROTHWELL, FIGG, ERNST & MANBECK, P.C.

(57) ABSTRACT

The polyamide-imide block copolymer according to the present invention makes it possible to provide a polyamide-imide film having excellent thermal stability and chemical resistance and, at the same time, having excellent mechanical properties.

12 Claims, No Drawings

POLYAMIDE-IMIDE BLOCK COPOLYMERS, PREPARATION METHOD THEREOF AND POLYAMIDE-IMIDE FILM COMPRISING THE SAME

CROSS-REFERENCE TO RELATED APPLICATION(S)

This application is a 35 U.S.C. 371 National Phase Entry Application from PCT/KR2020/004821, filed on Apr. 9, 2020 and designating the United States, which claims the benefit of Korean Patent Application No. 10-2019-0041556 filed on Apr. 9, 2019 with the Korean Intellectual Property Office, the disclosures of which are herein incorporated by reference in their entirety.

FIELD OF THE INVENTION

The present invention relates to a polyamide-imide block copolymer, a preparation method thereof, and a polyamide-imide film comprising the same.

BACKGROUND OF THE INVENTION

Aromatic polyamide-imide resins are polymers mostly having an amorphous structure, and exhibit excellent heat resistance, chemical resistance, electrical properties, and dimensional stability due to their rigid chain structure. These polyimide resins are widely used as materials for electric/electronics.

However, the wholly aromatic polyamide-imide resin is mostly insoluble and infusible despite its excellent heat resistance, and has poor molding and processability. Thus, there was a problem that it is difficult to use a conventional processing apparatus for processing a resin.

In addition, the polyimide resins have many limitations in use because they may appear dark brown in color due to the formation of a charge transfer complex (CTC) of π electrons present in the imide chain.

In order to solve the above limitations and obtain a colorless transparent polyimide resin, a method of restricting the movement of the π electrons by introducing a strong electron attracting group such as a trifluoromethyl ($-CF_3$) group; a method of reducing the formation of the CTC by introducing a sulfone ($-SO_2-$) group, an ether ($-O-$) group, or the like into the main chain to make a bent structure; or a method of inhibiting the formation of the resonance structure of the π electrons by introducing an aliphatic cyclic compound, has been proposed.

However, it was difficult for the polyimide resin according to the above proposals to exhibit sufficient heat resistance due to a curved structure or an aliphatic cyclic compound, and a film produced using the same still has limitations in exhibiting poor mechanical properties.

Further, most polyimide resins are formed by imidization of polyamic acid as a precursor, but as the final curing is performed in the curing process at a high temperature of 300° C. or more, the physical properties of the electrical wiring and substrates are reduced, in particular, when used as a semiconductor protective film, it may cause a problem of lowering the electrical properties of the semiconductor or destroying the semiconductor properties.

Therefore, in order to be used as a flexible display material in recent years, there is a need for the development of polyamide-imide block copolymer capable of low temperature curing process together with excellent optical properties, mechanical properties and chemical resistance.

BRIEF SUMMARY OF THE INVENTION

The present invention provides a polyamide-imide block copolymer exhibiting excellent heat resistance, chemical resistance and mechanical properties while being colorless and transparent.

The present invention also provides a method for preparing the above-mentioned polyamide-imide block copolymer.

The present invention further provides a polyamide-imide film comprising the above-mentioned polyamide-imide block copolymer.

According to one aspect of the present invention, a polyamide-imide block copolymer comprising a first repeat unit represented by the following Chemical Formula 1, a second repeat unit represented by the following Chemical Formula 2 and a third repeat unit represented by the following Chemical Formula 3 is provided herein:

[Chemical Formula 1]
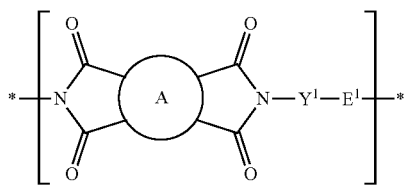

[Chemical Formula 2]
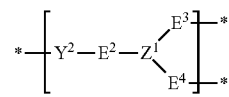

[Chemical Formula 3]
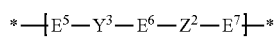

wherein, in Chemical Formulae 1 to 3,
each A is the same as or different from each other in each repeat unit, and is a substituted or unsubstituted tetravalent organic group,
$E^1$, $E^2$, $E^3$, $E^4$, $E^5$, $E^6$ and $E^7$ are the same as or different from each other in each repeat unit, and are a single bond or $-NH-$,
each $Z^1$ is the same as or different from each other in each repeat unit, and is a trivalent organic group derived from at least one compound selected from the group consisting of triacyl halide, triamine and tricarboxylic acid,
each $Z^2$ is the same as or different from each other in each repeat unit, and is a divalent organic group derived from at least one compound selected from the group consisting of diacyl halide, diamine and dicarboxylic acid, and
$Y^1$, $Y^2$, and $Y^3$ are the same as or different from each other in each repeat unit, and each independently, a divalent aromatic organic group having 6 to 30 carbon atoms, wherein the aromatic organic group exists alone; or two or more aromatic organic groups are bonded to each other to form a divalent condensed ring; or two or more aromatic organic groups are linked by a single bond, a fluorenylene group, $-O-$, $-S-$, $-C(=O)-$, $-CH(OH)-$, $-S(=O)_2-$, $-Si(CH_3)_2-$, $-(CH_2)_p-$ (where 1≤p≤10), $-(CF_2)_q-$ (where 1≤q≤10), $-C(CH_3)_2-$, $-C(CF_3)_2-$, or $-C(=O)NH-$, with the proviso that at least one of $Y^1$, $Y^2$ and Y³ is substituted with one or more photocurable functional groups selected from the group consisting of a (meth)acrylate group and a functional group represented by the following Chemical Formula 4,

[Chemical Formula 4]

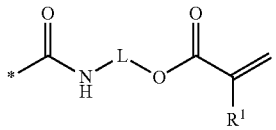

each R¹ is the same as or different from each other in each repeat unit, and is hydrogen or an alkyl group having 1 to 10 carbon atoms, each L is the same as or different from each other in each repeat unit, and is a single bond or an alkylene having 1 to 10 carbon atoms, wherein the total sum of the repeat units in which $Y^1$, $Y^2$ and $Y^3$ are substituted with a photocurable functional group is 10 mol % to 80 mol % based on 100 moles of the total repeat units.

According to another aspect of the present invention, a method for preparing the above-mentioned polyamide-imide block copolymer is provided. According to yet another aspect of the present invention, a polyamide-imide film comprising the above-mentioned polyamide-imide block copolymer is provided.

Hereinafter, the polyamide-imide block copolymer, the preparation method thereof and the polyamide-imide film comprising the same according to specific embodiments of the invention will be explained in more detail.

Prior to that, the terms are used merely to refer to specific embodiments, and are not intended to restrict the present invention, unless explicitly specified otherwise herein.

As used herein, the singular forms "a", "an" and "the" are intended to include the plural forms as well, unless the context clearly indicates otherwise.

The terms "comprises", "comprising", "includes" and/or "including" when used herein specifies the presence of stated features, regions, integers, steps, operations, elements and/or components, but does not preclude the presence or addition of one or more other features, regions, integers, steps, operations, elements, components, and/or groups thereof.

The terms including ordinal numbers such as "a first", "a second", etc. are used only for the purpose of distinguishing one component from another component, and are not limited by ordinal numbers. For instance, a first component may be referred to as a second component, or similarly, the second component may be referred to as the first component, without departing from the scope of the present invention.

As used herein, a weight average molecular weight means a weight average molecular weight converted in terms of polystyrene, measured by GPC method. During the process of measuring weight average molecular weight converted in terms of polystyrene measured by GPC, commonly known analysis equipment and detectors such as refractive index detector, and analysis columns may be used, and commonly applied temperature condition, solvent, flow rate may be applied.

I. Polyamide-Imide Block Copolymer

According to one embodiment of the invention, a polyamide-imide block copolymer comprising a first repeat unit represented by the Chemical Formula 1, a second repeat unit represented by the Chemical Formula 2 and a third repeat unit represented by the Chemical Formula 3 is provided.

Polyamide-imide copolymers are applied to various fields and are required to satisfy several physical properties at the same time. As a result of further studies by the present inventors, it has been found that a polyamide-imide-based block copolymer which comprises a brancher structure having three reactive substituents on the amide block and which is copolymerized by introducing a photocurable functional group capable of crosslinking to at least one of amide and imide blocks at a specific molar ratio during the preparation of the polyamide-imide block copolymer can exhibit excellent mechanical properties while being colorless and transparent.

A brancher in the polyamide block can impart a stable network structure to the copolymer, and can improve not only intramolecular crosslinking but also intermolecular interaction, thus realizing improved physical properties. Furthermore, it was confirmed that the photocurable functional group can induce intermolecular crosslinking to strengthen the structure of the network, and improve the chemical resistance of the film. Further, it was confirmed that the solubility is improved and it is easy to apply to a solution process at the time of producing into a film.

Hereinafter, each repeat unit will be described in detail.

(I) Imide Repeat Unit: First Repeat Unit

[Chemical Formula 1]

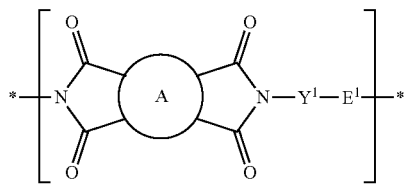

wherein, in Chemical Formula 1, each A is the same as or different from each other in each repeat unit, and is a substituted or unsubstituted tetravalent organic group, each $E^1$ is the same as or different from each other in each repeat unit, and are a single bond or —NH—, each $Y^1$ is the same as or different from each other in each repeat unit, and each independently, a divalent aromatic organic group having 6 to 30 carbon atoms, wherein the aromatic organic group exists alone; or two or more aromatic organic groups are bonded to each other to form a divalent condensed ring; or two or more aromatic organic groups are linked by a single bond, a fluorenylene group, —O—, —S—, —C(=O)—, —CH(OH)—, —S(=O)$_2$—, —Si(CH$_3$)$_2$—, —(CH$_2$)$_p$— (where 1≤p≤10), —(CF$_2$)$_q$— (where 1≤q≤10), —C(CH$_3$)$_2$—, —C(CF$_3$)$_2$—, or —C(=O) NH—, with the proviso that $Y^1$ may be substituted with one or more photocurable functional groups selected from the group consisting of a (meth)acrylate group and a functional group represented by the following Chemical Formula 4. The substitution ratio of the photocurable functional group in the repeat unit will be described later:

[Chemical Formula 4]

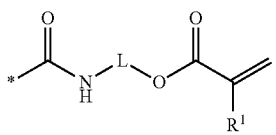

each $R^1$ is the same as or different from each other in each repeat unit, and is hydrogen or an alkyl group having 1 to 10 carbon atoms, and each L is the same as or different from each other in each repeat unit, and is a single bond or an alkylene having 1 to 10 carbon atoms.

Preferably, the A can be any one selected from groups represented by the following:

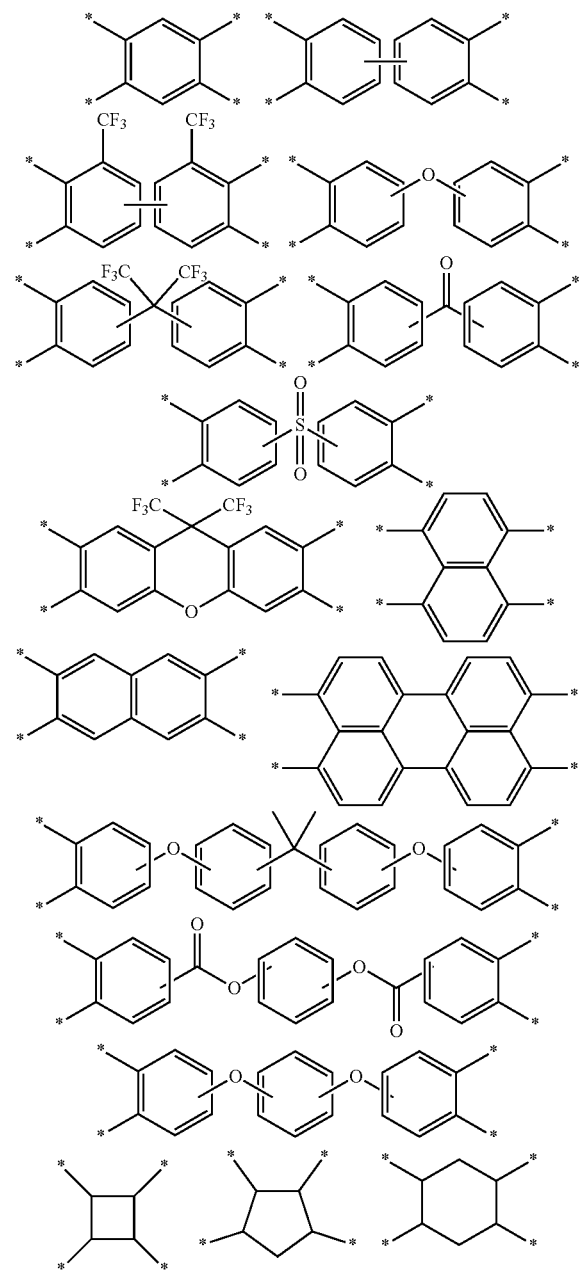

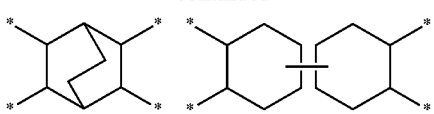

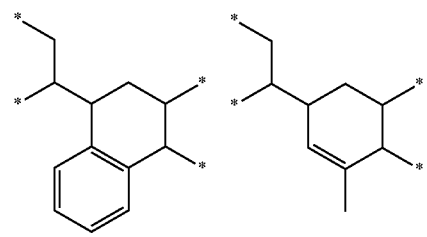

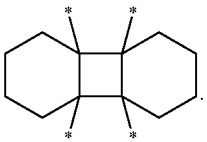

Preferably, the $Y^1$ is a group represented by the following Chemical Formula Y-1 or Y-2:

[Chemical Formula Y-1]

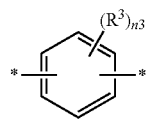

[Chemical Formula Y-2]

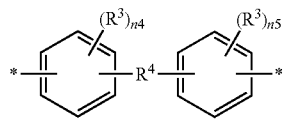

wherein, in Chemical Formula Y-1 and Chemical Formula Y-2, $R^3$ are each independently a (meth)acrylate group or a functional group represented by the following Chemical Formula 4,

[Chemical Formula 4]

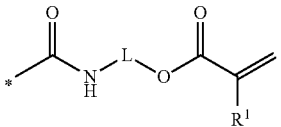

$R^1$ and L are as described above, n3, n4 and n5 are each independently 0 to 4, with the proviso that at least one of n3, n4 and n5 is 1 or more, and each $R^4$ is independently a single bond, —O—, —S—, —C(=O)—, —CH(OH)—, —S(=O)$_2$—, —Si(CH$_3$)$_2$—, —(CH$_2$)$_p$— (where 1≤p≤10), —(CF$_2$)$_q$— (where 1≤q≤10), —C(CH$_3$)$_2$—, —C(CF$_3$)$_2$—, or —C(=O)NH—.

Preferably, the first repeat unit may include a repeat unit represented by the following Chemical Formula 1-1:

[Chemical Formula 1-1]

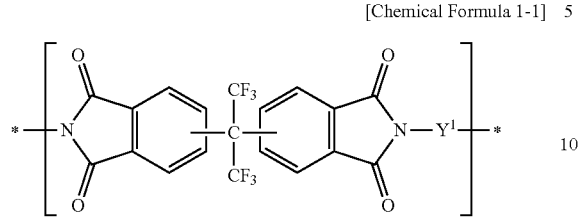

wherein, in Chemical Formula 1-1,
$Y^1$ is as defined above.
(ii) Amide Repeat Unit: Second Repeat Unit and Third Repeat Unit
Second Repeat Unit

[Chemical Formula 2]

wherein, in Chemical Formula 2,
$E^2$, $E^3$ and $E^4$ are the same as or different from each other in each repeat unit, and each independently, a single bond or —NH—,
each $Z^1$ is the same as or different from each other in each repeat unit, and is a trivalent organic group derived from at least one compound selected from the group consisting of triacyl halide, triamine and tricarboxylic acid,
each $Y^2$ is the same as or different from each other in each repeat unit, and each independently, a divalent aromatic organic group having 6 to 30 carbon atoms, wherein the aromatic organic group exists alone; or two or more aromatic organic groups are bonded to each other to form a divalent condensed ring; or two or more aromatic organic groups are linked by a single bond, a fluorenylene group, —O—, —S—, —C(=O)—, —CH(OH)—, —S(=O)$_2$—, —Si(CH$_3$)$_2$—, —(CH$_2$)$_p$— (where $1 \leq p \leq 10$), —(CF$_2$)$_q$— (where $1 \leq q \leq 10$), —C(CH$_3$)$_2$—, —C(CF$_3$)$_2$—, or —C(=O)NH—, with the proviso that $Y^2$ may be substituted with one or more photocurable functional groups selected from the group consisting of a (meth)acrylate group and a functional group represented by the Chemical Formula 4. The substitution ratio of the photocurable functional group in the repeat unit will be described later.
Preferably, the $Z^1$ may be any one selected from groups represented by the following:

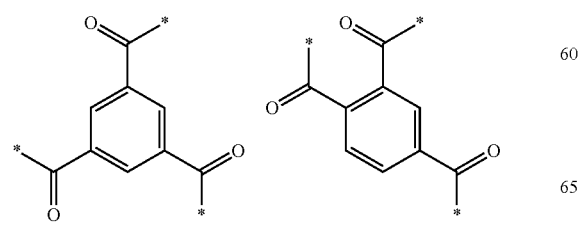

-continued

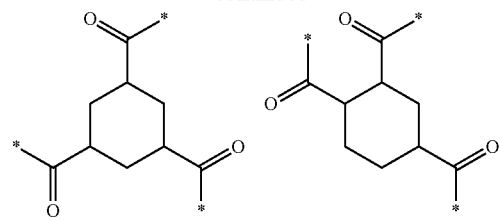

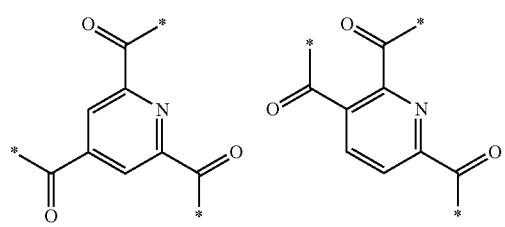

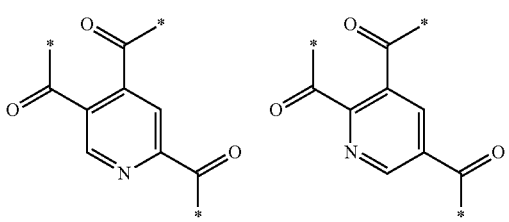

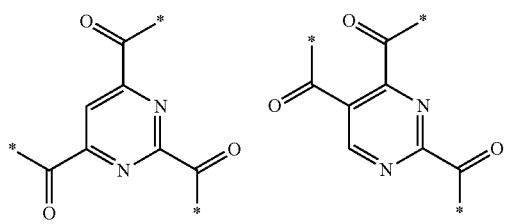

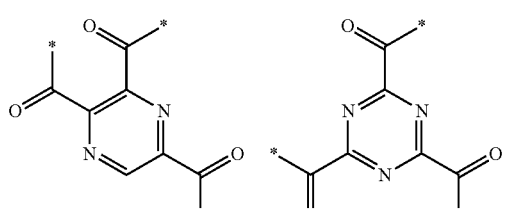

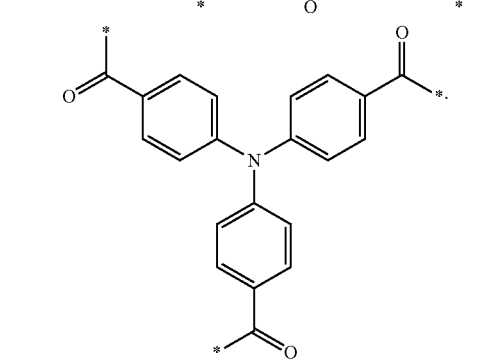

Preferably, the $Y^2$ may be a group represented by the Chemical Formula Y-1 or Y-2.

Preferably, the second repeat unit may include a repeat unit represented by the following Chemical Formula 2-1:

[Chemical Formula 2-1]

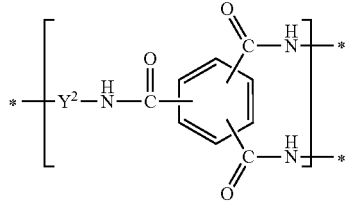

wherein, in Chemical Formula 2-1,
$Y^2$ is as defined above in the Chemical Formula 1.

Third Repeat Unit

[Chemical Formula 3]

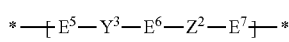

wherein, in Chemical Formula 3,
$E^5$, $E^6$ and $E^7$ are the same as or different from each other in each repeat unit, and each independently, a single bond or —NH—,
each $Z^2$ is the same as or different from each other in each repeat unit, and is a divalent organic group derived from at least one compound selected from the group consisting of diacyl halide, diamine and dicarboxylic acid, and
each $Y^3$ is the same as or different from each other in each repeat unit, and each independently, a divalent aromatic organic group having 6 to 30 carbon atoms, wherein the aromatic organic group exists alone; or two or more aromatic organic groups are bonded to each other to form a divalent condensed ring; or two or more aromatic organic groups are linked by a single bond, a fluorenylene group, —O—, —S—, —C(=O)—, —CH(OH)—, —S(=O)$_2$—, —Si(CH$_3$)$_2$—, —(CH$_2$)$_p$— (where 1≤p≤10), —(CF$_2$)$_q$— (where 1≤q≤10), —C(CH$_3$)$_2$—, —C(CF$_3$)$_2$—, or —C(=O) NH—, with the proviso that $Y^3$ may be substituted with one or more photocurable functional groups selected from the group consisting of a (meth)acrylate group and a functional group represented by the Chemical Formula 4. The substitution ratio of the photocurable functional group in the repeat unit will be described later:

Preferably, the $Z^2$ may be any one selected from groups represented by the following:

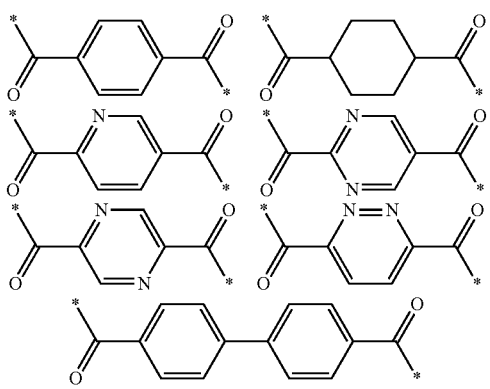

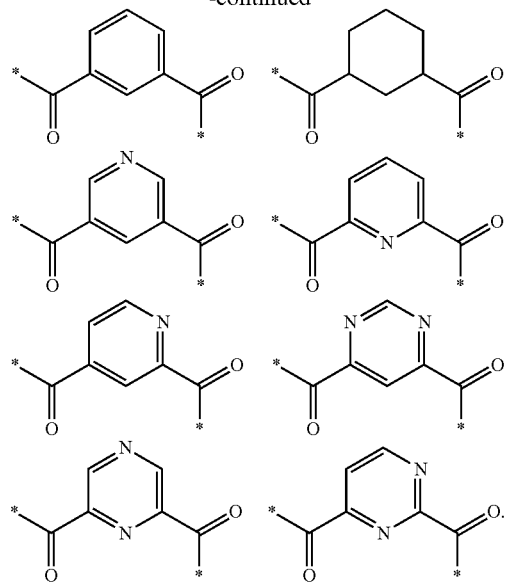

Preferably, the $Y^3$ may be a group represented by the Chemical Formula Y-1 or Y-2.

Preferably, the third repeat unit may include a repeat unit represented by the following Chemical Formula 3-1:

[Chemical Formula 3-1]

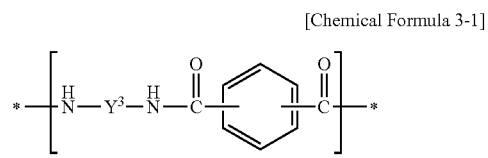

wherein, in Chemical Formula 3-1,
$Y^3$ is as defined above.

According to one embodiment of the present invention, a repeat unit in which $Y^1$, $Y^2$ and $Y^3$ are substituted with one or more photocurable functional groups selected from the group consisting of a (meth)acrylate group and a function group represented by the Chemical Formula 4 is included in an amount of 10 mol % to 80 mol %, preferably 30 mol % to 70 mol % based on 100 moles of the total repeat units contained in the polyamide-imide block copolymer.

As the repeat unit containing the photocurable functional group is contained within the above range, the polyimide-based block copolymer can exhibit improved mechanical properties while being colorless and transparent. Further, the chemical resistance of the film can be further improved.

Specifically, by containing a photocurable functional group having a specific structure in at least one of the amide and imide blocks, the mechanical properties may be improved by forming an intermolecular crosslinked structure. In addition, by containing a photocurable functional group at the terminal within the above range of content, the solubility is excellent and various solvents can be used. In addition, since the chemical imidization process and the photocurable functional group-introducing process are simultaneously performed during the copolymer production process, the copolymerization is facilitated even by a low-temperature chemical imidization process, thereby producing a colorless transparent copolymer.

When the photocurable functional group is contained in a small amount exceeding the above lower limit, the intermolecular crosslinking is insufficient and the effect of improving mechanical properties is reduced. When the photocurable functional group is contained in an excessive amount exceeding the upper limit, the film may be easily broken at the time of film production and durability may be reduced.

100 moles of the total repeats unit means the total repeat units contained in the polyamide-imide block copolymer, for example, it means that the total sum of the first repeat unit, which is an imide repeat unit, and the second repeat unit and the third repeat unit, which are an amide repeat unit, is converted into 100 moles. The repeat unit in which $Y^1$, $Y^2$ and $Y^3$ are substituted with a photocurable functional group means the total sum of the repeat units in which $Y^1$, $Y^2$ and $Y^3$ are substituted with a photocurable functional group in the first repeat unit, the second repeat unit and the third repeat unit.

According to one embodiment of the present invention, in the polyamide-imide block copolymer, the molar ratio of the total sum of the second repeat unit and the third repeat unit, which are the amide repeat units, is 10:90 to 90:10, and preferably 30:70 to 70:30, relative to the first repeat unit which is the imide repeat unit. By satisfying the above molar ratio, the thermal properties, mechanical properties, and optical properties of the copolymer can be simultaneously improved.

When the molar ratio of the amide repeat unit to the first repeat unit that is the imide repeat unit is out of the lower limit range, the solubility decreases, the yellowness increases and the transparency of the film decreases significantly. When the molar ratio is out of the upper limit range, the modulus is reduced and the mechanical properties may be deteriorated.

The polyamide-imide block copolymer according to one embodiment of the present invention may have a weight average molecular weight (measured by GPC) of 5,000 to 300,000 g/mol, preferably 15,000 to 150,000 g/mol. When the weight average molecular weight is satisfied, the mechanical properties, thermal properties, and optical properties intended by the present invention can be further improved.

II. Method for Preparing Polyamide-Imide Block Copolymer

Meanwhile, according to another embodiment of the present invention, a method for preparing the above-mentioned polyamide-imide block copolymer is provided.

Conventionally, in order to prepare a polyamide-imide copolymer containing (meth)acrylate or the like as a photocurable functional group for increasing reactivity, it was prepared via two or more step synthetic processes including the step of substituting a hydroxyl group with a (meth)acrylate in addition to the conventional imidization step. The imidization step of such conventional polymerization method is carried out by a thermal imidization reaction proceeding at a high temperature, and thus, there was a problem in that it is difficult to apply it to a product that requires transparency due to the browning of the produced polyimide. Further, the step of substituting with a photocurable functional group such as a (meth)acrylate group has low reactivity, and thus, there was a problem that it is difficult to control the amount of substitution, with as much as a desired amount.

As a result of further studies by the present inventors, it was confirmed that in the method for preparing the polyamide-imide block copolymer, a chemical imidization reaction and a substitution reaction of a photocurable functional group are simultaneously performed to solve the above-mentioned problems, and at the same time, the reaction efficiency is remarkably improved.

Specifically, it was confirmed that there is no problem such as thermal denaturation of the copolymer prepared by carrying out imidization in a relatively low temperature process through the single reaction step, and by introducing a specific photocurable substituent into the repeat unit simultaneously with the imidization, the prepared copolymer exhibits excellent solubility, and the solution process is easy, and further a polyamide-imide copolymer having excellent mechanical properties due to intermolecular crosslinking can be produced.

The method for preparing a polyamide-imide block copolymer according to one embodiment of the present invention includes firstly reacting a diamine compound with a dianhydride compound to form a polyamic acid block.

The monomer component used in the above step may be appropriately selected so that the finally prepared copolymer satisfies the repeat unit represented by the Chemical Formula 1. In particular, the diamine compound may include a diamine compound containing a hydroxyl group. In the imidization reaction by the hydroxyl group, a photocurable substituent is introduced simultaneously with the imidization reaction of the chemical formula, so that a polyamide-imide copolymer having excellent physical properties can be produced.

For example, the diamine compound containing a hydroxyl group may include preferably an aromatic diamine, for example, 3,3'-dihydroxy benzidine (DHBZ), 2,2-bis(3-hydroxy-4-aminophenyl)hexafluoropropane, 2,2'-bis(3-amino-4-hydroxyphenyl)hexafluoropropane or a combination thereof, but is not limited thereto.

Further, the dianhydride compound may include 3,3',4,4'-biphenyl tetracarboxylic dianhydride (BPDA), bicyclo[2.2.2]oct-7-ene-2,3,5,6-tetracarboxylic dianhydride (BTDA), 3,3',4,4'-diphenylsulfone tetracarboxylic dianhydride (DSDA), 4,4'-(hexafluoroisopropylidene)diphthalic anhydride (6FDA), 4,4'-oxydiphthalic anhydride (ODPA), pyromellitic dianhydride (PMDA), 4-(2,5-dioxotetrahydrofuran-3-yl)-1,2,3,4-tetrahydronaphthalene-1,2-dicarboxylic anhydride (DTDA), or the like, but is not limited thereto.

Next, the method for preparing a polyamide-imide block copolymer according to one embodiment of the present invention includes mixing at least one compound selected from the group consisting of triacyl halide, triamine and tricarboxylic acid and at least one compound selected from the group consisting of aromatic diacyl halide, aromatic diamine and aromatic dicarboxylic acid with the result of the step of forming the polyamic acid block, and reacting them to form a polyamide block.

The monomer component used in the above step may be appropriately selected so that the finally prepared copolymer satisfies the structure of the repeat units represented by the Chemical Formula 2 and Chemical Formula 3. In particular, by including at least one compound selected from the group consisting of triacyl halide, triamine and tricarboxylic acid, a stable network is formed in the copolymer by introducing a brancher structure in the polyamide block, thereby further improving the mechanical properties.

The monomer component used for introducing the brancher structure may include at least one compound selected from the group consisting of benzene-1,3,5-tricarbonyl trichloride, benzene-1,3,5-tricarboxylic acid, benzene-1,3,5-triamine, benzene-1,2,4-triamine, cyclohexane-1,3,5-triamine, cyclohexane-1,2,4-triamine, and pyrimidine-2,4,6-triamine, but is not limited thereto.

In addition, the diamine compound may include a diamine compound containing a hydroxyl group, and the hydroxyl group allows introduction of a photocurable functional group even in the amide block by an addition reaction of an imidization reaction. As an example of the diamine compound containing a hydroxyl group, the components previously used in the step of forming the polyamic acid block may be used in a similar manner.

Furthermore, the diacyl halide may include, for example, isophthaloyl dichloride, terephthaloylchloride, and the like, and the dicarboxylic acid may include, for example, isophthalic acid, terephthalic acid, and the like, but is not limited thereto.

The diamine compound substituted with a hydroxyl group may be included in an amount of 10 mol % to 80 mol %, preferably 30 mol % to 70 mol %, based on 100 moles of the total diamine compound used for forming the polyamic acid block and the polyamide block. The content ratio corresponds to a molar ratio of the repeat units in which in the above-mentioned polyamide-imide copolymer, the $Y^1$, $Y^2$ and $Y^3$ are substituted with a photocurable functional group.

The hydroxyl group may be substituted with a photocurable functional group in the imidization step described below. By satisfying the above content range, it is possible to significantly improve the thermal stability, mechanical properties, and process efficiency for the subsequent solution process of the produced copolymer.

The method for preparing a polyamide-imide block copolymer according to one embodiment of the present invention includes adding at least one compound of a compound containing a (meth)acrylate group and a compound containing a functional group represented by the Chemical Formula 4 to the mixture containing the polyamic acid block and the polyamide block to perform imidization.

In the imidization step, the type of the compound containing the (meth)acrylate group and the compound containing the functional group represented by Chemical Formula 4 is not particularly limited, but for example, the compound containing a (meth)acrylate group may be (meth)acrylic anhydride, and the compound containing a functional group represented by the Chemical Formula 4 may be 2-isocyanatoethyl (meth)acrylate.

In the imidization step, a step of introducing a photocurable functional group into a hydroxyl group in the block can be performed simultaneously with the chemical imidization reaction of the polyamic acid block.

Specifically, the imidization step may be performed at a low temperature of 20° C. to 100° C. The thermal stability of the copolymerized polymer can be improved as compared with the conventional high-temperature thermal imidization step, and yellowing does not occur and thus, it is easy to apply to a transparent film. Further, the chemical imidization reaction is excellent in reactivity, and a photocurable functional group can be substituted in a desired content range. Due to the photocurable functional group, it is possible to improve the mechanical properties of the copolymer by intermolecular crosslinking, and due to the excellent solubility of the photocurable functional group, the solution process during film formation is easy.

Through the imidization step, the hydroxyl group contained in the polyamic acid block and the polyamide block can be substituted with a (meth)acrylate group or a functional group represented by the following Chemical Formula 4:

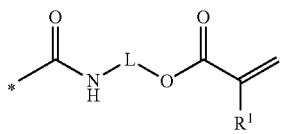

[Chemical Formula 4]

each $R^1$ is the same or different from each repeat unit, and is hydrogen or an alkyl group having 1 to 10 carbon atoms, and each L is the same or different from each repeat unit and is a single bond or an alkylene having 1 to 10 carbon atoms.

In the process for preparing the polyamide-imide block copolymer, other additives, such as a crosslinking agent, a curing accelerator, a phosphorus-based flame retardant, an antifoaming agent, a leveling agent, an anti-gel agent, or a mixture thereof may be further included within a range that does not affect the desired effect. Further, an organic solvent may be further included in order to improve the coating properties.

Specific examples of the organic solvent include one or more selected from the group consisting of dimethylsulfoxide; N-methyl-2-pyrrolidone; N,N-dimethylformamide (DMF); N,N-dimethylacetamide (DMAc); N-methylformamide (NMF); alcohols selected from the group consisting of methanol, ethanol, 2-methyl-1-butanol and 2-methyl-2-butanol; ketones selected from the group consisting of γ-butyrolactone, cyclohexanone, 3-hexanone, 3-heptanone, 3-octanone, acetone and methyl ethyl ketone; tetrahydrofuran; trichloroethane; and a combination of thereof, but is not limited thereto.

III. Polyamide-Imide Film

According to another embodiment of the present invention, a polyamide-imide film comprising the above-mentioned polyamide-imide block copolymer is provided.

As described above, the film according to the present invention has excellent thermal stability and, at the same time, has excellent mechanical properties, and can realize excellent optical properties.

In one embodiment of the present invention, the polyamide-imide film has a yellowness index (Y.I.) of 1.5 to 1.75, preferably 1.5 to 1.7 as measured according to ASTM D1925 for a specimen having a thickness of 20 to 100 PM. By satisfying the yellowness index value in the above range, it has excellent optical properties and is easily applied to various electrical and electronic products.

In one embodiment of the present invention, the polyamide-imide film has a modulus according to ASTM D648 of 4.0 GPa to 5.0 GPa, preferably 4.2 GPa to 5.0 GPa. By satisfying the modulus value in the above range, it has excellent mechanical properties, and is easily applied to various electrical and electronic products. The modulus can be measured using DMA q800.

The polyamide-imide film can be produced by a conventional method such as a dry method or a wet method using the polyamide-imide block copolymer. For example, the polyamide-imide film may be obtained by a method of coating a solution containing the polyamide-imide block copolymer onto an arbitrary support to form a film, and then evaporating the solvent from the film to dry it. If necessary, stretching and heat treatment of the polyamide-imide film may be performed. Further, when the polyamide-imide block copolymer according to the present invention is used, the solubility is significantly improved by a photocurable substituent at the terminal, and thus, the solution process can be easily performed.

The polyamide-imide film according to the present invention can be used as a material for various molded articles requiring high mechanical properties and optical properties along with colorless transparency. For example, the polyamide-imide film containing the polyamide-imide block copolymer can be applied to a display substrate, a protective film for a display, a touch panel, a cover film for a flexible or foldable device, etc.

Advantageous Effects

The polyamide-imide block copolymer according to the present invention makes it possible to provide a polyamide-imide film having excellent thermal stability and chemical resistance and, at the same time, having excellent mechanical properties, and capable of realizing excellent optical properties.

DETAILED DESCRIPTION OF THE EMBODIMENTS

Hereinafter, preferred examples are provided for better understanding. However, these examples are for illustrative purposes only, and the invention is not intended to be limited by these examples.

[PREPARATION EXAMPLE]—PREPARATION OF POLYAMIDE-IMIDE BLOCK COPOLYMER

Preparation Example 1

While passing nitrogen through a four-necked round bottomed flask equipped with a mechanical stirrer, a nitrogen inlet, a temperature controller and a cooler, 3.63 g (9.91 mmol) of 2,2-bis(3-amino-4-hydroxyphenyl)hexafluoropropane (BisAPAF) and 6.34 g (19.8 mmol) of 2,2'-bis(trifluoromethyl)-4,4'-diamino biphenyl (TFMB)] were dissolve in 183 g of N-methyl-2-pyrrolidone (NMP). Then, 8.00 g (18.0 mmol) of 4,4'-(hexafluoroisopropylidene)diphthalic anhydride (6FDA) was added thereto, and the mixture was stirred at 40° C. for about 3 hours. 2.38 g (11.7 mmol) of terephthaloyl chloride (TPC) were added and then 0.05 g (0.188 mmol) of 1,3,5-benzenetricarbonyl trichloride (BTT) was further added, and then stirred for 3 hours. Then, 3.47139 g (15.76 mmol) of butylated hydroxy toluene (BHT), 35.60 g (450 mmol) of pyridine and 34.69 g (225 mmol) of methacrylic anhydride were added, and then stirred at 60° C. overnight. After the reaction was completed, excess ethanol (2 L) was added dropwise to the stirring reaction solution to form a precipitate. The obtained precipitate was separated by filtration under reduced pressure, washed three times with ethanol, and then dried at room temperature under vacuum for about 24 hours to obtain 15 g of a polyamide-imide copolymer (A-1) having a methacrylate group.

As a result of 1H-NMR analysis, the polyamide-imide copolymer (A-1) was calculated by those in which all the hydroxyl groups (—OH) were substituted with methacrylate groups. Accordingly, it was confirmed that the molar ratio of the repeat units substituted with methacrylate was 33 mol %.

Preparation Example 2

16 g of polyamide-imide copolymer (A-2) was obtained in the same manner in Preparation Example 1, except that a molar ratio of 2,2'-bis(3-amino-4-hydroxyphenyl)-hexafluoropropane:2,2'-bis(trifluoromethyl)-4,4'-diamino biphenyl was changed to 0.20:0.79 instead of 0.33:0.66.

As a result of 1H-NMR analysis, the polyamide-imide copolymer (A-2) was calculated by those in which all the hydroxyl groups (—OH) were substituted with methacrylate groups. Accordingly, it was confirmed that the molar ratio of the repeat units substituted with methacrylate was 20 mol %.

Preparation Example 3

16 g of polyamide-imide copolymer (A-3) was obtained in the same manner in Preparation Example 1, except that a molar ratio of 2,2'-bis(3-amino-4-hydroxyphenyl)-hexafluoropropane:2,2'-bis(trifluoromethyl)-4,4'-diamino biphenyl was changed to 0.5:0.49 instead of 0.33:0.66.

As a result of 1H-NMR analysis, the polyamide-imide copolymer (A-3) was calculated by those in which all the hydroxyl groups (—OH) were substituted with methacrylate groups. Accordingly, it was confirmed that the molar ratio of the repeat units substituted with methacrylate was 50 mol %.

Preparation Example 4

15 g of polyamide-imide copolymer (A-4) was obtained in the same manner in Preparation Example 1, except that 225 mmol of 2-isocyanatoethyl (meth)acrylate was used instead of 225 mmol of methacrylic anhydride. Accordingly, it was confirmed that a molar ratio of the repeat units substituted with

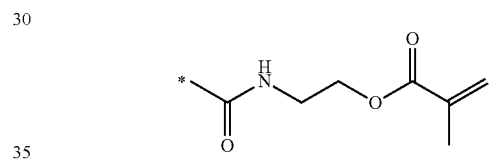

was 33 mol %.

Comparative Preparation Example 1

While passing nitrogen through a four-necked round bottomed flask equipped with a mechanical stirrer, a nitrogen inlet, a temperature controller and a cooler, 3.63 g (9.91 mmol) of 2,2-bis(3-amino-4-hydroxyphenyl)hexafluoropropane (BisAPAF) and 6.34 g (19.8 mmol) of 2,2'-bis(trifluoromethyl)-4,4'-diamino biphenyl (TFMB) were dissolve in 183 g of N-methyl-2-pyrrolidone (NMP). Then, 8.00 g (18.0 mmol) of 4,4'-(hexafluoroisopropylidene)diphthalic anhydride (6FDA) was added thereto, and the mixture was stirred at 40° C. for about 3 hours. 2.44 g (12.001 mmol) of terephthaloyl chloride (TPC) was further added, and then stirred for 3 hours. Then, 1.39 g (15.76 mmol) of butylated hydroxy toluene (BHT), 35.60 g (450 mmol) of pyridine and 34.69 g (225 mmol) of methacrylic anhydride were added, and then stirred at 60° C. overnight. After the reaction was completed, excess ethanol (2 L) was added dropwise to the stirring reaction solution to form a precipitate. The obtained precipitate was separated by filtration under reduced pressure, washed three times with ethanol, and then dried at room temperature under vacuum for about 24 hours to obtain 15 g of a polyamide-imide copolymer (B-1) having a methacrylate group.

As a result of 1H-NMR analysis, the polyamide-imide copolymer (B-1) was calculated by those in which all the hydroxyl groups (—OH) were substituted with methacrylate groups. Accordingly, it was confirmed that a molar ratio of the repeat units substituted with methacrylate was 33 mol %.

Comparative Preparation Example 2

15 g of polyamide-imide copolymer (B-2) was obtained in the same manner in Preparation Example 1, except that a molar ratio of 2,2'-bis(3-amino-4-hydroxyphenyl)-hexafluoropropane:2,2'-bis(trifluoromethyl)-4,4'-diamino biphenyl was changed to 0.05:0.94 instead of 0.33:0.66.

As a result of 1H-NMR analysis, the polyamide-imide copolymer (B-2) was calculated by those in which all the hydroxyl groups (—OH) were substituted with methacrylate groups. Accordingly, it was confirmed that a molar ratio of the repeat units substituted with methacrylate was 5 mol %.

Comparative Preparation Example 3

15 g of polyamide-imide copolymer (B-3) was obtained in the same manner in Preparation Example 1, except that a molar ratio of 2,2'-bis(3-amino-4-hydroxyphenyl)-hexafluoropropane:2,2'-bis(trifluoromethyl)-4,4'-diamino biphenyl was changed to 0.90:0.09 instead of 0.33:0.66.

As a result of 1H-NMR analysis, the polyamide-imide copolymer (B-3) was calculated by those in which all the hydroxyl groups (—OH) were substituted with methacrylate groups. Accordingly, it was confirmed that a molar ratio of the repeat units substituted with methacrylate was 90 mol %.

Comparative Preparation Example 4

A polyimide-based block copolymer (B-4) containing a repeat unit represented by the following Chemical Formula a-1 and a repeat unit represented by the following Chemical Formula a-2 were used. The molar ratio of the repeat unit of the Chemical Formula a-1 to the repeat unit of the Chemical Formula a-2 is 50:50.

[Chemical Formula a-1]

[Chemical Formula a-2]

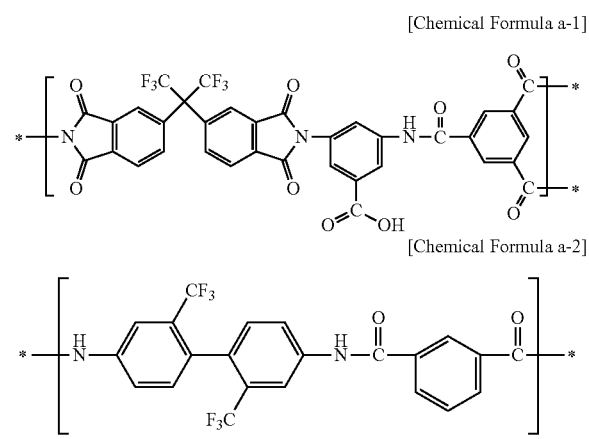

Example and Comparative Example

Polyamide-imide block copolymer samples obtained in the Preparation Examples and Comparative Preparation Examples were dissolved in methyl ethyl ketone (MEK) to prepare about 15 wt % of a solution. The solution was subjected to casting on a glass plate through a bar coater equipment. At this time, the drying was performed at a temperature of 90° C. for 15 minutes, and then photocured using a UV curing machine. Then, the heat treatment was performed at 170° C. for 15 minutes and peeled to prepare polyamide-imide films of Examples and Comparative Examples having a thickness of 50 μm.

TABLE 1

| Category | Copolymer | Whether to include a 3D brancher structure | Photocurable functional group (mol %)* | Weight average molecular weight of copolymer |
|---|---|---|---|---|
| Example 1 | A-1 | ○ | a-1/33% | 35,700 |
| Example 2 | A-2 | ○ | a-1/20% | 42,800 |
| Example 3 | A-3 | ○ | a-1/50% | 39,900 |
| Example 4 | A-4 | ○ | a-2/33% | 36,800 |
| Comparative Example 1 | B-1 | X | a-1/33% | 38,200 |
| Comparative Example 2 | B-2 | ○ | a-1/5% | 47,000 |
| Comparative Example 3 | B-3 | ○ | a-1/90% | 39,800 |
| Comparative Example 4 | B-4 | ○ | a-3/50% | 490,000 |

*Represents the content of the total sum of repeat units substituted with a photocurable functional group, a-1 is a structure in which a methacrylate group is substituted with a photocurable functional group, a-2 is a structure in which

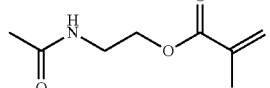

is substituted, and a-3 is a structure in which a carboxy group is substituted.

Experimental Example

The physical properties of the polyamide-imide film prepared in Examples and Comparative Examples were evaluated by the following methods, and the results are shown in Table 2 below.

1) Yellowness Index

The yellowness index of the polyamide-imide film samples (thickness of 50±2 μm) prepared in Examples and Comparative Examples was measured in accordance with ASTM D1925 using a COH-400 Spectrometer (NIPPON DENSHOKU INDUSTRIES), and the values are shown in Table 2 below.

2) Glass Transition Temperature (Tg)

The glass transition temperature of the polymer film samples (thickness of 50±2 μm) prepared in Examples and Comparative Examples was measured using a TMA IC600 device, and the values are shown in Table 2 below.

3) Modulus

The modulus (GPa) of the polymer film samples (thickness of 50±2 μm) prepared in Examples and Comparative Examples was measured using DMA q800, and the results are shown in Table 2 below.

4) Chemical Resistance

The chemical resistance was evaluated for the polymer film samples (thickness of 50±2 μm) prepared in Examples and Comparative Examples.

The prepared film samples were immersed in acetone and N-methyl-1,2-pyrrolidone (NMP), respectively, and then allowed to stand at room temperature (25° C.) for 5 minutes, and then taken out. The change of the film was evaluated according to the following criteria.

<Evaluation Criteria>

○ Excellent—No change in film

Δ Normal—Change observed (partial swelling)

X Poor—Film surface melted

TABLE 2

| Category | Yellowness index | Glass transition temperature (° C.) | Modulus (GPa) | Chemical resistance |
|---|---|---|---|---|
| Example 1 | 1.69 | 187 | 4.56 | ○ |
| Example 2 | 1.69 | 180 | 4.20 | ○ |
| Example 3 | 1.72 | 188 | 4.08 | ○ |
| Example 4 | 1.75 | 175 | 4.00 | ○ |
| Comparative Example 1 | 1.79 | 160 | 3.90 | ○ |
| Comparative Example 2 | 1.62 | 165 | 3.81 | X |
| Comparative Example 3 | 2.28 | 179 | 3.42 | ○ |
| Comparative Example 4 | 2.05 | 152 | 3.15 | X |

As can be seen in Table 2, it was confirmed that when using a copolymer containing a specific repeat unit and a specific molar ratio of a photocurable functional group according to the present invention, it has excellent thermal stability and chemical resistance, and at the same time, has excellent mechanical properties, and can realize excellent optical properties.

It was confirmed that in Comparative Example 1, a copolymer not containing a three-dimensional crosslinked structure is used, and thereby, all properties are deteriorated compared to those of Examples of the present invention.

It was confirmed that in Comparative Example 2, the repeat unit containing the photocurable functional group is only 5 mol %, and thus, the chemical resistance and durability are lowered compared to those of the Examples.

It was confirmed that in Comparative Example 3, the repeat unit containing the photocurable functional group is 90 mol %, and the over-cured film is very brittle and can be cracked, which results in a decrease in physical properties compared to those of the Examples.

It was confirmed that Comparative Example 4 is a case where the carboxy group terminal was included instead of the photocurable functional group of the present invention, the transparency of the thin film is remarkably reduced, and the physical properties are lowered compared to those of the Examples.

What is claimed is:

1. A polyamide-imide block copolymer comprising: a first repeat unit represented by the following Chemical Formula 1, a second repeat unit represented by the following Chemical Formula 2 and a third repeat unit represented by the following Chemical Formula 3:

[Chemical Formula 1]
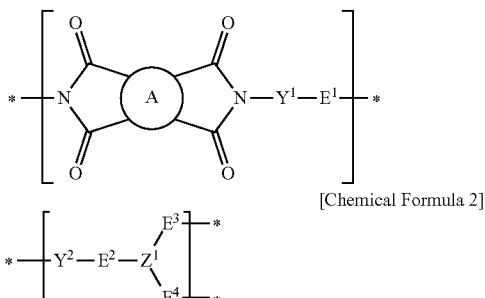

[Chemical Formula 2]
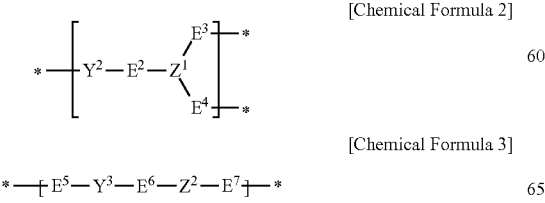

[Chemical Formula 3]
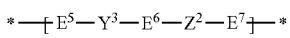

wherein, in the Chemical Formulae 1 to 3,
each A is the same as or different from each other in each repeat unit, and is a substituted or unsubstituted tetravalent organic group,
$E^1$, $E^2$, $E^3$, $E^4$, $E^5$, $E^6$ and $E^7$ are the same as or different from each other in each repeat unit, and are a single bond or —NH—,
each $Z^1$ is the same as or different from each other in each repeat unit, and is a trivalent organic group derived from at least one compound selected from the group consisting of triacyl halide, triamine and tricarboxylic acid,
each $Z^2$ is the same as or different from each other in each repeat unit, and is a divalent organic group derived from at least one compound selected from the group consisting of diacyl halide, diamine and dicarboxylic acid, and
$Y^1$, $Y^2$, and $Y^3$ are the same as or different from each other in each repeat unit, and each independently, a divalent aromatic organic group having 6 to 30 carbon atoms, wherein the divalent aromatic organic group exists alone; or two or more aromatic organic groups are bonded to each other to form a divalent condensed ring; or two or more aromatic organic groups are linked by a single bond, a fluorenylene group, —O—, —S—, —C(=O)—, —CH(OH)—, —S(=O)$_2$—, —Si(CH$_3$)$_2$—, —(CH$_2$)$_p$—, where $1 \leq p \leq 10$, —(CF$_2$)$_q$—, where $1 \leq q \leq 10$, —C(CH$_3$)$_2$—, —C(CF$_3$)$_2$—, or —C(=O)NH—, with the proviso that at least one of $Y^1$, $Y^2$ and $Y^3$ is substituted with one or more photocurable functional groups selected from the group consisting of a (meth)acrylate group and a functional group represented by the following Chemical Formula 4,

[Chemical Formula 4]
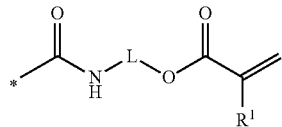

each $R^1$ is the same as or different from each other in each repeat unit, and is hydrogen or an alkyl group having 1 to 10 carbon atoms, and each L is the same as or different from each other in each repeat unit, and is a single bond or an alkylene having 1 to 10 carbon atoms,
wherein the sum of the repeat units in which $Y^1$, $Y^2$ and $Y^3$ are substituted with the photocurable functional group is 20 mol % to 50 mol % based on 100 moles of the total repeat units, and
wherein a weight average molecular weight is 5,000 to 300,000 g/mol.

2. The polyamide-imide block copolymer according to claim 1,
wherein each of the $Y^1$, $Y^2$ and $Y^3$ is a group represented by the following Chemical Formula Y-1 or Y-2:

[Chemical Formula Y-1]
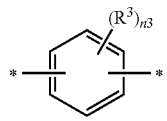

-continued

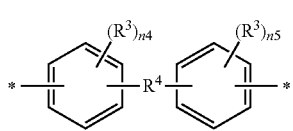
[Chemical Formula Y-2]

wherein, in the Chemical Formula Y-1 and Chemical Formula Y-2,
$R^3$ are each independently a (meth)acrylate group or a functional group represented by the following Chemical Formula 4,

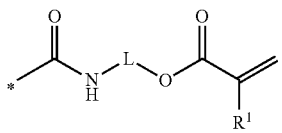
[Chemical Formula 4]

each $R^1$ is the same as or different from each other in each repeat unit, and is hydrogen or an alkyl group having 1 to 10 carbon atoms, each L is the same as or different from each other in each repeat unit, and is a single bond or an alkylene having 1 to 10 carbon atoms,
n3, n4 and n5 are each independently 0 to 4, with the proviso that at least one of n3, n4 and n5 is 1 or more, and
each $R^4$ is independently a single bond, —O—, —S—, —C(=O)—, —CH(OH)—, —S(=O)$_2$—, —Si(CH$_3$)$_2$—, —(CH$_2$)$_p$—, where $1 \leq p \leq 10$, —(CF$_2$)$_q$—, where $1 \leq q \leq 10$, —C(CH$_3$)$_2$—, —C(CF$_3$)$_2$—, or —C(=O)NH—.

3. The polyamide-imide block copolymer according to claim 1, wherein A is any one selected from groups represented by the following:

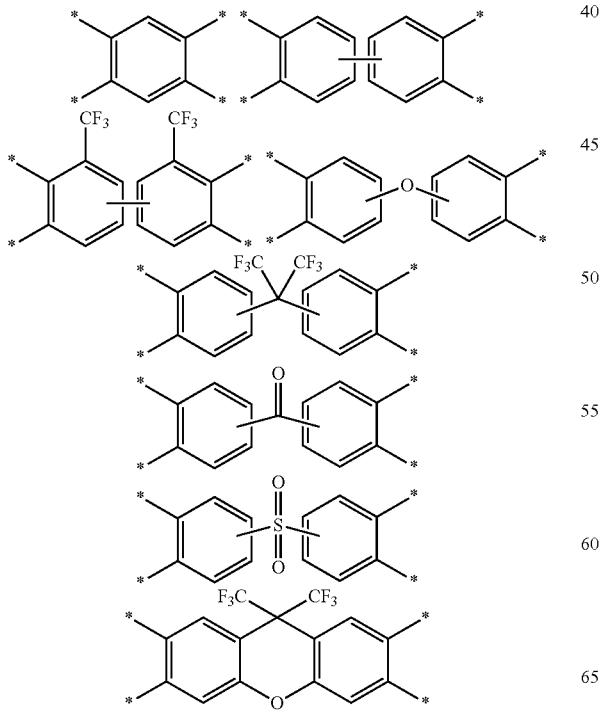

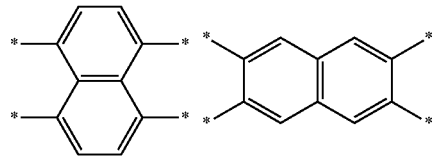

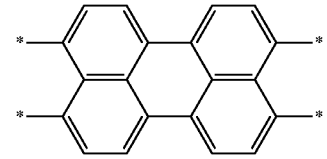

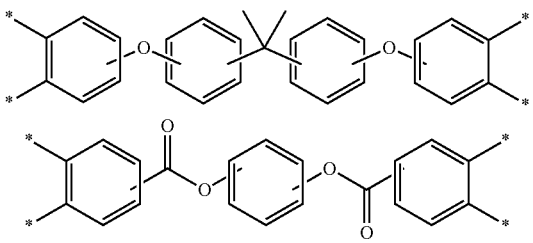

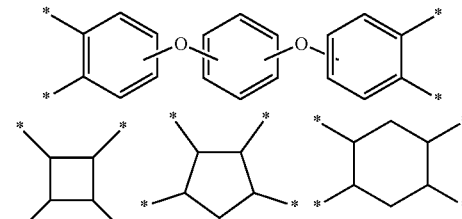

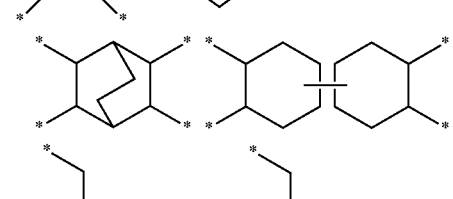

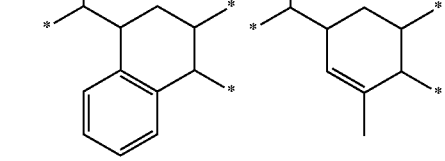

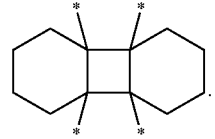

4. The polyamide-imide block copolymer according to claim 1,
wherein the $Z^1$ is any one selected from groups represented by the following:

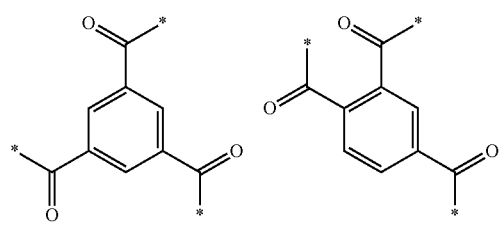

-continued

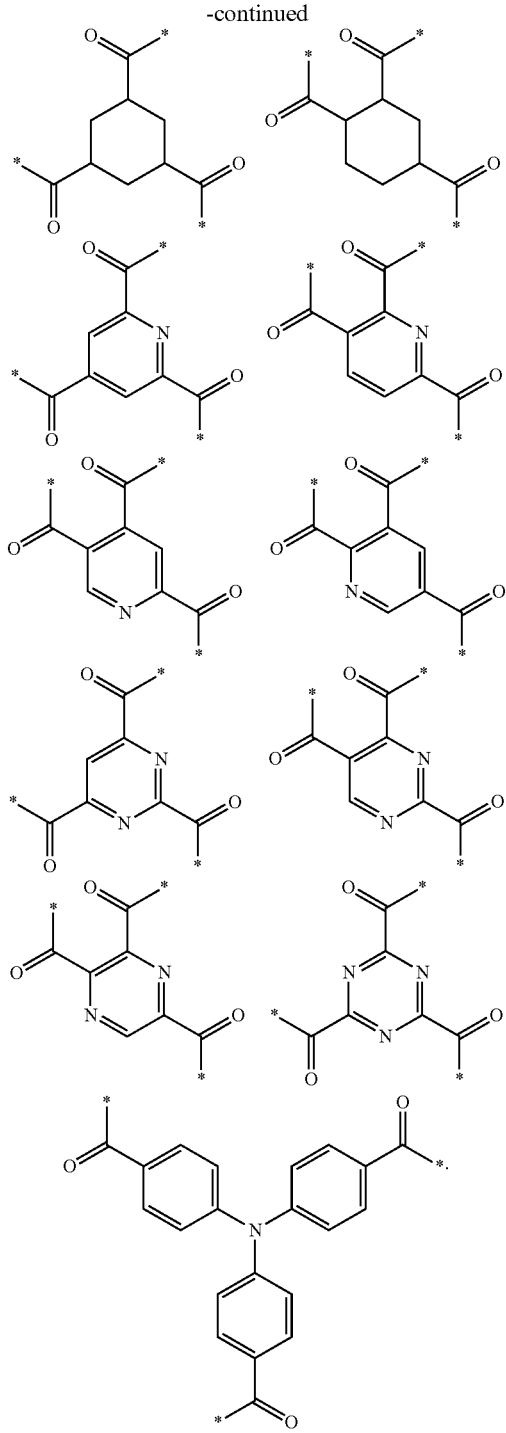

5. The polyamide-imide block copolymer according to claim 1, wherein the $Z^2$ is any one selected from groups represented by the following:

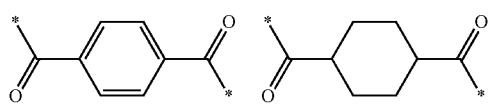

-continued

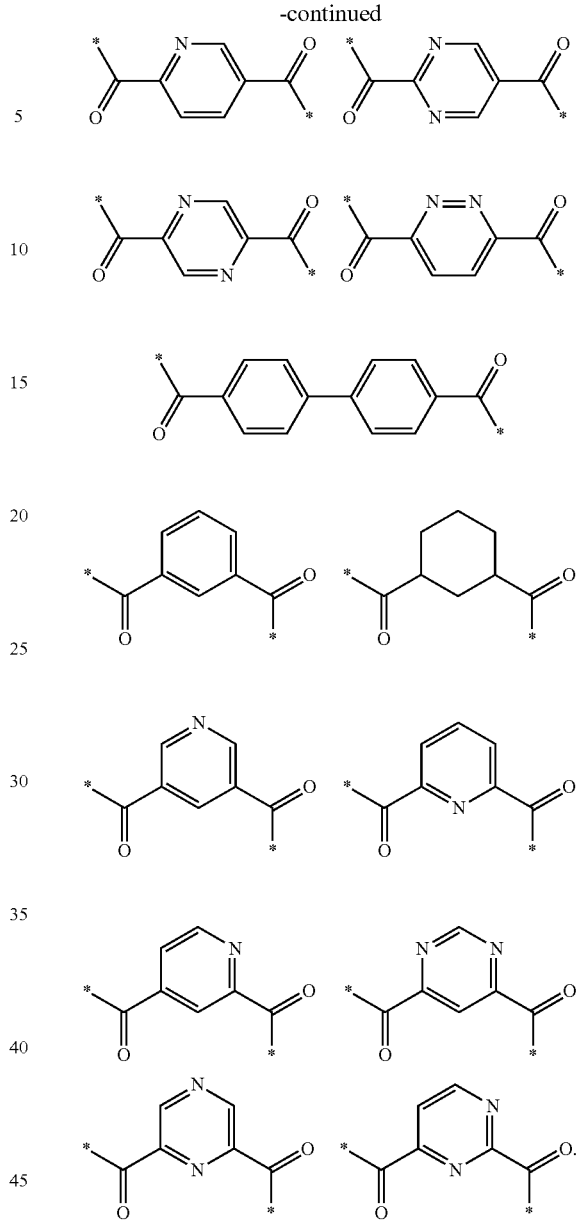

6. The polyamide-imide block copolymer according to claim 1, wherein the first repeat unit includes a repeat unit represented by Chemical Formula 1-1:

[Chemical Formula 1-1]

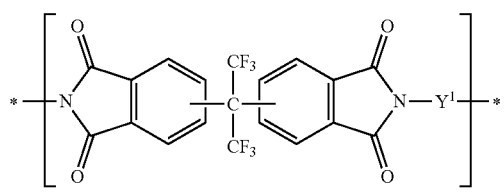

wherein, in the Chemical Formula 1-1, $Y^1$ is as defined in claim 1.

7. The polyamide-imide block copolymer according to claim 1,
wherein the second repeat unit includes a repeat unit represented by Chemical Formula 2-1:

[Chemical Formula 2-1]

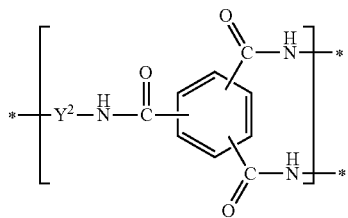

wherein, in the Chemical Formula 2-1,
$Y^2$ is as defined in claim 1.

8. The polyamide-imide block copolymer according to claim 1,
wherein the third repeat unit includes a repeat unit represented by Chemical Formula 3-1:

[Chemical Formula 3-1]

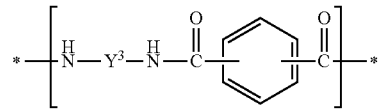

wherein, in the Chemical Formula 3-1,
$Y^3$ is as defined in claim 1.

9. The polyamide-imide block copolymer according to claim 1,
wherein a molar ratio of the sum of the second repeat unit and the third repeat unit is 10:90 to 90:10 relative to the first repeat unit.

10. A polyamide-imide film comprising the polyamide-imide block copolymer according to claim 1.

11. The polyamide-imide film according to claim 10,
wherein a yellowness index (Y.I.) according to ASTM D1925 is 1.5 to 1.75.

12. The polyamide-imide film according to claim 10,
wherein a modulus according to ASTM D648 is 4.0 GPa to 5.0 GPa.

* * * * *